United States Patent [19]

Kriek et al.

[11] Patent Number: 4,542,177

[45] Date of Patent: Sep. 17, 1985

[54] THERMOPLASTIC POLYESTER MOLDING COMPOSITION HAVING AN IMPROVED IMPACT PERFORMANCE

[75] Inventors: George R. Kriek, Bethal Park; James Y. J. Chung, Wexford; Gerard E. Reinert, McMurray; Dieter Neuray, Pittsburgh, all of Pa.

[73] Assignee: Mobay Chemical Corporation, Pittsburgh, Pa.

[21] Appl. No.: 626,074

[22] Filed: Jun. 29, 1984

[51] Int. Cl.$^4$ .......................... C08K 7/14; C08K 3/40

[52] U.S. Cl. ...................................... 524/98; 524/100; 524/104; 524/106; 524/157; 524/159; 524/195; 524/196; 524/198; 524/539; 524/604; 524/605

[58] Field of Search ................. 524/100, 98, 106, 104, 524/159, 157, 196, 195, 198, 539, 604, 605

[56] References Cited

U.S. PATENT DOCUMENTS

| | | | |
|---|---|---|---|
| 3,193,522 | 7/1965 | Neumann et al. | 260/45.9 |
| 3,193,523 | 7/1965 | Neumann et al. | 260/45.9 |
| 3,193,524 | 7/1965 | Holtschmidt et al. | 260/45.9 |
| 3,553,157 | 1/1971 | Dijkstra et al. | 260/40 |
| 3,580,886 | 5/1971 | Stewart et al. | 260/45.9 |
| 3,852,101 | 12/1974 | Batchelor, Jr. | 117/138.8 F |
| 4,013,613 | 3/1977 | Abolins et al. | 260/40 R |
| 4,022,752 | 5/1977 | Horn et al. | 524/605 |
| 4,052,360 | 10/1977 | Berardinelli et al. | 524/195 |
| 4,110,302 | 8/1978 | Thomas et al. | 260/40 R |
| 4,123,415 | 10/1978 | Wambach | 260/40 R |
| 4,178,277 | 12/1979 | Gebauer et al. | 260/40 R |
| 4,222,932 | 9/1980 | Rademacher | 524/605 |
| 4,279,801 | 7/1981 | Kramer et al. | 260/40 R |
| 4,292,226 | 9/1981 | Wenzel et al. | 260/29.2 TN |
| 4,399,244 | 8/1983 | Bier | 524/605 |

OTHER PUBLICATIONS

Polyurethanes, Chemistry and Techology, Saunders and Frisch, 1962, pp. 118–121.
New Developments in the Field of Blocked Isocyanates II, by Z. Wicks, Jr. published in Prog. Org. Coat. 1981 (9) (1), pp. 3–28.

*Primary Examiner*—Lewis T. Jacobs
*Attorney, Agent, or Firm*—Gene Harsh; Lawrence S. Pope; Aron Preis

[57] ABSTRACT

The invention relates to a thermoplastic molding composition comprising a blend of a thermoplastic polyester and a reinforcing amount of a reinforcing agent. An improvement in the impact performance of the composition is disclosed to result upon the incorporation therewith of a blocked (end-capped) polyisocyanate prepolymer.

11 Claims, No Drawings

THERMOPLASTIC POLYESTER MOLDING COMPOSITION HAVING AN IMPROVED IMPACT PERFORMANCE

DETAILED DESCRIPTION OF THE INVENTION

Thermoplastic Polyester

Thermoplastic polyester resins in the present context are polymers or copolymers prepared by condensing primarily aromatic dicarboxylic acids (or an ester forming compound thereof) with a glycol (or an ester forming compound thereof). Among the dicarboxylic acids which are suitable for preparing polyesters in accordance with the present invention are the aromatic dicarboxylic acids including for instance terephthalic acid, isophthalic acid, orthophthalic acid, 2,6-naphthalene dicarboxylic acid, 1,5-naphthalene dicarboxylic acid, as well as aliphatic dicarboxylic acids including for example adipic acid, sebacic acid, azelaic acid, cycloaliphatic dicarboxylic acids such as 1,3-cyclohexane dicarboxylic acid, 1,4-cyclohexane dicarboxylic acid and the like, or ester forming compounds thereof.

The glycols suitable for preparing the polyesters of the invention include for example aliphatic diols having 2 to 10 carbon atoms such as ethylene glycol, 1,3-propylene glycol, 1,4-butanediol, neopentyl glycol, 1,5-pentanediol, 1,6-hexanediol, decamethylene glycol, cyclohexanediol as well as long-chain glycols (MW up to about 6000) such as poly(tetramethylene glycol) and mixtures thereof.

The preferred polyester is polyethylene terephthalate. The dicarboxylic acid component of the polyethylene terephthalate consists mainly of terephthalic acid and may contain up to 10 mol %, based on the total mols of acid or other aromatic dicarboxylic acids having from 6 to 14 carbon atoms, of aliphatic dicarboxylic acids having from 4 to 8 carbon atoms or of cycloaliphatic dicarboxylic acids having from 8 to 12 carbon atoms. Examples of such dicarboxylic acids which may be included with terephthalic acid are phthalic acid, isophthalic acid, naphthalene-2,6-dicarboxylic acid, diphenyl-4,4 -dicarboxylic acid, adipic acid, sebacic acid and cyclohexanediacetic acid.

The diol component of the polyethylene terephthalate consists mainly of ethylene glycol. It may, however, contain up to 10 mol % of aliphatic diols having from 3 to 12 carbon atoms, cycloaliphatic diols having from 6 to 15 carbon atoms or aromatic diols having from 6 to 21 carbon atoms. Examples of such additional diols ("codiols") include propane-1,3-diol, butane-1,4-diol, pentane-1,5-diol, hexane-1,6-diol or cyclohexane-1,4-dimethanol, 3-methyl-pentanediol-(2,4), 2-methylpentanediol-(1,4), 2,2,4-trimethylpentanediol-(1,3), 2-ethylhexanediol-(1,3), 2,2-diethylpropanediol-(1,3), hexanediol-(1,3), 1,4-di-($\beta$-hydroxyethoxy)-benzene, 2,2-bis(4-hydroxycyclohexyl)-propane, 2,4-dihydroxy-1,1,3-3-tetramethyl-cyclobutane, 2,2-bis-(3-$\beta$-hydroxyethoxyphenyl)-propane and 2,2-bis-(4-hydroxypropoxyphenyl)-propane.

The polyethylene terephthalates can be branched by incorporating relatively small amounts of trihydric or tetrahydric alcohols or tribasic or tetrabasic acids, as described in German Offenlegungsschrift No. 1,900,270 and in U.S. Pat. No. 3,692,744. Examples of suitable branching agents include trimesic acid, pyromellitic acid, trimethylolpropane and ethane, and pentaerythritol. It is advisable not to use more than 1 mol % of branching agent, based on the quantity of acid component.

Polyethylene terephthalates derived from terephthalic acid and ethylene glycol are preferred and homopolyethylene terephthalate, i.e. a product produced substantially only from ethylene glycol and terephthalic acid or its esters, or its anhydride is most preferred.

The polyester resins of the compositions in accordance with the invention are characterized in that their intrinsic viscosity (I.V.) is at least about 0.4 and preferably about 0.6 to about 1.6 dl/gm measured as a 1% solution in a 60:40 mixture of phenol and tetrachloroethane at 30° C. These resins are available commercially or can be prepared by known means such as by the alcoholysis of esters of terephthalic acid with ethylene glycol followed by polymerization, by heating the glycols with the free acids or with their halide derivative and similar processes such as are described among others in U.S. Pat. Nos. 2,465,319 and 3,047,539, both incorporated herein by reference.

The preferred thermoplastic polyester in the present context is polyethylene terephthalate, PET, such as is available under the designation Tenite 7741 from Eastman Kodak Corporation.

Blocked (End-Capped) Polyisocyanate Prepolymers

Polyisocyanate prepolymers suitable in their end-capped configuration as a synergist in the present invention are generally described in U.S. Pat. No. 4,292,226, incorporated herein by reference.

Accordingly, suitable starting materials for producing the NCO-prepolymers are:

1. Any organic polyisocyanates, preferably diisocyanates, corresponding to the formula $$Q\ (NCO)_n$$

in which
n=2 to 4, preferably 2, and
Q represents a saturated aliphatic hydrocarbon radical containing from 2 to 18, preferably from 6 to 10 carbon atoms, a saturated cycloaliphatic hydrocarbon radical containing from 4 to 15, preferably from 6 to 10 carbon atoms, an aromatic hydrocarbon radical containing from 6 to 15, preferably from 6 to 13 carbon atoms or an arylaliphatic hydrocarbon radical containing from 8 to 15, preferably from 8 to 13 carbon atoms, at least 2 carbon atoms being arranged between the NCO-groups in each case.

Examples of suitable polyisocyanates, particularly diisocyanates, are tetramethylene diisocyanate, hexamethylene diisocyanate, dodecamethylene diisocyanate, cyclobutane-1,3-diisocyanate, cyclohexane-1,3- and -1,4-diisocyanate and mixtures of these isomers, 1-isocyanato-3,3,5-trimethyl-5-isocyanatomethyl cyclohexane (IPDI), 2,4- and 2,6-hexahydrotoluene diisocyanate and mixtures of these isomers, hexahydro-1,3- and/or 1,4-phenylene diisocyanate, perhydro-2,4'- and/or -4,4'-diphenylmethane diisocyanate, 1,3- and 1,4-bis-(isocyanatomethyl) cyclohexane and 1,3- and 1,4-bis(2-isocyanato-2-propyl) benzene, 1,3- and 1,4-phenylene diisocyanate, 2,4- and 2,6-toluene diisocyanate and mixtures of these isomers, diphenylmethane-2,4'- and/or -4,4'-diisocyanate and naphthalene-1,5-diisocyanate. It is of course also possible to use mixtures of these isocyanates. Small quantities of mono- and triisocyanates may also be used. It is also possible to use the modified polyisocyanates known per se in polyurethane chemistry, i.e. polyisocyanates containing for example carbodiimide groups, allophanate groups, isocyanurate groups, urethane groups and/or biuret groups, in the process according to the invention, although this is not preferred.

Preferred polyisocyanates are hexamethylene diisocyanate, 1-isocyanato-3,3,5-trimethyl-5-isocyanatomethyl cyclohexane, diphenylmethane-4,4'-diisocyanate, dicyclohexylmethane-4,4'-diisocyanate, 2,4- and 2,6-toluene diisocyanate and mixtures thereof.

2. Any organic compounds containing at least two isocyanate-reactive groups, more particularly organic compounds containing a total of two amino groups, thiol groups, carboxyl groups and/or hydroxyl groups and having molecular weights (weight average) in the range from about 61 to 10,000 and preferably in the range from about 300 to 4000 with the proviso that the backbone of the resulting prepolymer is substantially immiscible in the thermoplastic polyester matrix. The corresponding dihydroxyl compounds are preferably used. The use of compounds with a functionality of three or higher in the isocyanate polyaddition reaction in small quantities in order to obtain a certain degree of branching is also possible, as is the above-mentioned possible use of trifunctional or more highly functional polyisocyanates for the same purpose.

Preferred hydroxyl compounds are the hydroxy polyethers, hydroxy polythioethers, hydroxy polyacetals, hydroxy polyolefins, hydroxy polybutadiene, hydroxy polycarbonates and/or hydroxy polyester amides known per se in polyurethane chemistry.

The polyethers suitable for use in accordance with the invention, preferably containing two hydroxyl groups are also known per se and are obtained for example by polymerizing epoxides, such as ethylene oxide, propylene oxide, butylene oxide, tetrahydrofuran, styrene oxide or epichlorohydrin, on their own, for example in the presence of boron trifluoride, or by the addition of these epoxides, either in admixture or successively, with starting components containing reactive hydrogen atoms, such as alcohols and amines, for example water, ethylene glycol, 1,3- or 1,2-propylene glycol, 4,4'-dihydroxy diphenyl propane or aniline.

Polyethers modified by vinyl polymers of the type formed for example by polymerizing styrene, acrylonitrile in the presence of polyethers as described in U.S. Pat. Nos. 3,383,511; 3,304,273; 3,523,093; and 3,110,695, all incorporated herein by reference and German Patent No. 1,151,536 are also suitable. The more highly functional polyethers which may also be proportionately used are similarly obtained in known manner by alkoxylating starter molecules of relatively high functionality, for example, ammonia, ethanolamine, ethylene diamine or sucrose.

Among the polythioethers, particular reference is made to the condensation products of the thiodiglycol on its own and/or with other glycols, dicarboxylic acids, formaldehyde, aminocarboxylic acids or aminoalcohols. Depending on the co-components, the products in question are polythio mixed ethers, polythio ether esters, polythio ether ester amides.

Suitable polyacetals are, for example, the compounds obtainable from glycols, such as diethylene glycol, triethylene glycol, 4,4'-diethoxy diphenyl dimethyl methane, hexane diol and formaldehyde. Polyacetals suitable for use in accordance with the invention may also be obtained by polymerizing cyclic acetals.

Suitable polycarbonates containing hydroxyl groups are known per se and may be obtained for example by reacting diols, such as 1,3-propane diol, 1,4-butane diol and/or 1,6-hexane diol, diethylene glycol, triethylene glycol, tetraethylene diol, with diaryl carbonates, for example diphenyl carbonate, or phosgene.

The polyester amides and polyamides include for example the predominantly linear condensates obtained from polybasic saturated and unsaturated carboxylic acids or their anhydrides and polyhydric saturated and unsaturated amino alcohols, diamines, polyamines and their mixtures. Polyhydroxyl compounds already containing urethane or urea groups may also be used.

It is also possible to use low molecular weight polyols such as, for example, ethane diol, 1,2- and 1,3-propane diol, 1,4- and 1,3-butane diol, pentane diols, hexane diols, trimethylol propane, hexane triols, glycerol and pentaerythritol. Monofunctional alcohols, such as stearyl alcohol for example, may also be used in small quantities.

Representatives of the above-mentioned polyisocyanate and hydroxyl compounds suitable for use in the process according to the invention are described, for example, in High Polymers, Vol. XVI, "Polyurethanes, Chemistry and Technology" by Saunders-Frisch, Interscience Publishers, New York, London, Volume I, 1962, pages 32 to 42 and pages 44 to 54, and Volume II, 1964, pages 5 to 6 and 198 to 199, and also in Kunststoff-Handbuch, Volume VII, Vieweg-Höchtlen, Carl-Hanser-Verlag, Munich, 1966, for example on pages 45 to 71.

Further, U.S. Pat. No. 3,756,992 and U.S. Pat. No. 3,479,310 both incorporated herein by reference provide added information respecting the preparation of suitable polyurethane prepolymers which upon capping are useful in the present context.

Capped, or blocked, isocyanates are described, for instance in Polyurethanes, Chemistry and Technology by Saunders and Frisch, 1962, incorporated by reference herein—see especially pages 118–121 and in New Developments in the Field of Blocked Isocyanates II by Zeno W. Wicks, Jr., Polymers and Coatings Department, North Dakota State University, Fargo, North Dakota, Prog. Org. Coat., 1981 9(1) 3–28, incorporated herein by reference.

Blocking agents suitable for use in the process according to the invention are, in particular, compounds with preferably one isocyanate-reactive group which enter into an addition reaction with organic isocyanates at temperatures above about 50° C. and preferably at temperatures in the range of from about 60° to 100° C., and whose resulting addition products, in admixture with involatile polyols containing primary hydroxyl groups, react with the involatile polyols to form urethanes at temperatures in the range of from about 100° to 200° C., the reaction being accompanied by liberation of the blocking agent. Suitable blocking agents of this type are, for example, secondary or tertiary alcohols, such as isopropanol, or tert.-butanol, C-H-acid compounds, such as malonic acid dialkyl esters, acetyl acetone, acetoacetic acid alkyl esters, oximes, such as formaldoxime, acetaldoxime, methyl ethyl ketone oxime, cyclohexanone oxime, acetophenone oxime, benzophenone oxime or diethyl glyoxime, lactams, such as ε-caprolactam, δ-valerolactam, γ-butyrolactam, phenols, such as phenol, o-methyl phenol, N-alkyl amides, such as N-methyl acetamide, imides, such as phthalimide, imidazole, alkali metal bisulphites and trialkyl ammonium bisulphites.

The preferred blocking (or capping) agents are cyclic 1,3-diketone, for example 1,3-cyclohexanedione, hydroxamic acid ester, benzotriazole, imidazole oxime, for example 2-butanone oxime, alcohol, phenol, hydroxy substituted nitrogen compounds such as n-hydroxy phthalimide.

A particularly preferred blocked (capped) prepolymer is an ε-caprolactam capped TDI-polyurethane prepolymer.

In preparing the composition of the invention, a blend is prepared containing about 0.5 to about 8, preferably 1.0–5.0 phr (parts per hundred weight of resin) of the end-blocked (capped) polyisocyanate prepolymer, the phr values being related to the weight of the polyester resin.

Reinforcing Agents

Reinforcing agents are an essential component in the composition of the invention. A reinforcing amount, preferably about 5 to about 60 percent, most preferably about 10 to about 50 percent, relative to the weight of the polyester and the reinforcement of a reinforcing agent is used. Generally, the reinforcing agent may be fibers, whiskers or platelets of metals or non-metals. Among the metals, aluminum, iron and nickel may be mentioned and among the non-metals mention may be made of carbon, asbestos, metal oxides and metal silicates and glass. Glass fibers are the preferred reinforcing agent. Glass fiber reinforcements are well known and are available readily in commerce. Among the available varieties are "E-glass" and "C-glass" which differ from one another in terms of their respective chemical compositions; both are suitable in the present context. For the most preferred embodiments, the reinforcement is provided by filaments having a diameter of about 7 to about 15 microns. Neither the form of the filamentous reinforcement nor the length and diameter of the individual filaments are critical in the present context, generally, however, chopped strands shorter than ¼ inch are beneficially used.

The thermoplastic resin composition of this invention may be prepared by uniformly mixing the components, using any desired means such as a Banbury mixer, a hot roll or an extruder. The mixture is extruded and pelletized in a known manner, and is suitable for injection molding into a variety of useful articles The composition may contain additives such as are well known in the art including stabilizers, mold release agents, crystallization promoters, dyes and pigments, flame retardants as well as fillers.

The invention is further illustrated, but is not intended to be limited by the following examples in which all parts and percentages are by weight unless otherwise specified.

EXAMPLES

Example 1

The preparation of an ε-caprolactam capped TDI-polyisocyanate prepolymer suitable in the present context was carried out as follows:

The polyol components (302 parts by weight of polyol A which is a 2000 MW difunctional polypropylene oxide, 157 parts by weight of polyol B which is a 3000 MW - glycerine initiated trifunctional polypropylene oxide and 232.3 parts by weight of a 4800 MW polyol C which is a glycerine initiated polyether containing both propylene oxide and ethylene oxide) and 1.66 parts by weight of trimethylol propane and 106.8 parts of TDI (a mixture of 80% of 2,4-isomer and 20% of the 2,6-isomer) were mixed and heated with continued stirring to 70°–75° C. The mixture was allowed to react until the NCO content was just below the theoretical level (3.0%) which reaction took about 7 hours. 81.4 parts by weight of ε-caprolactam were then charged and the mixture was heated with stirring to 80°–85° C. and allowed to react until no free isocyanate was detected by infrared spectroscopy, which reaction time was about 8 hours. The product was characterized in that its blocked NCO content was 2.6% and its viscosity, at 25° C. was 55,000 mPa-s.

EXAMPLE 2

Compositions in accordance with the present invention were prepared and their properties determined. The preparation of the molding compositions entailed blending of the dried components (dried at 95° C. overnight) and extrusion (2" vented extruder; temperature profile—rear to front, ° C.—280, 280, 270, 260, 250, 270, 270; compression ratio 2.75:1; screw speed 90 rpm). Injection molding of the samples was carried out using a Newbury 4 oz. machine, at the following molding conditions:

| zone set temperature | rear | 260° C. |
| --- | --- | --- |
| | front | 260° C. |
| | nozzle | 254° C. |
| | mold | (95–121° C.) |
| cycle time | * 25 seconds | |
| no back pressure. | | |

The table shown below summarizes the properties and compositional makeup of compositions prepared in accordance with the present invention.

The compositions, based on Tenite 7741—a polyethylene terephthalate resin from Eastman Kodak having an intrinsic viscosity of 0.6, all contained glass fibers PPG 3540 from PPG Industries having a nominal fiber diameter of about 10 microns, as the reinforcing agent. The blocked polyisocyanate prepolymer used in the preparation of the compositions was ε-caprolactam capped TDI-polyisocyanate prepolymer, the preparation of which was described above. In addition to these essential compounds, the compositions described below contained the following components which presence is not critical to the invention (the amounts are in percent relative to the weight of the composition): 0.1% of an antioxidant (octadecyl-3-(3′,5′-di-tert-butyl-4′-hydroxyphenyl)propionate), 0.1% of tris-[(3-ethyl-oxetanyl-3)methyl]phosphite as thermal stabilizer, 0.1% of a hydrolysis stabilizer conforming structurally to

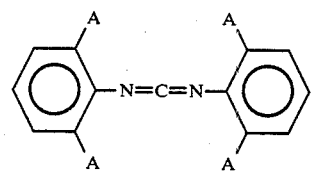

where A is

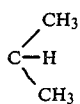

0.5% of an epoxy compound (Epon 1031) and 0.2% of talc. These are represenred in the table as "stabilizers".

| | Example | |
|---|---|---|
| | 1 | 2 |
| Components, (%) | | |
| polyethylene terephthalate | 68.9 | 64.1 |
| glass fibers | 30.0 | 30.0 |
| stabilizers | 1.1 | 1.1 |
| Blocked polyisocyanate prepolymer | — | 4.8 |
| Impact strength, Izod ⅛" | | |
| (J/m) notched | 86.1 | 136 |
| (J/m) unnotched | 1056 | 1108 |

Naturally, modifications and/or variations of the presently disclosed invention are possible in light of the above disclosure. It should however be understood that such are within the scope of the invention as defined by the following claims.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising a blend of
   (i) polyethylene terephthalate,
   (ii) a reinforcing amount of a reinforcing agent of said polyethylene terephthalate and
   (iii) about 0.5 to about 8.0 parts per hundred weight of said polyethylene terephthalate of an end-capped polyisocyanate prepolymer.

2. The molding composition of claim 1 wherein said reinforcing agent is glass fibers.

3. The molding composition of claim 1 wherein said polyisocyante prepolymer is derived from (a) an organic polyisocyanate corresponding to $$Q(NCO)_n$$

wherein n is 2–4 and Q denotes a $C_2$–$C_{18}$ saturated aliphatic hydrocarbon radical, $C_4$–$C_{15}$ saturated cycloaliphatic hydrocarbon radical, $C_6$–$C_{15}$ aromatic hydrocarbon radical or a $C_8$–$C_{15}$ arylaliphatic hydrocarbon radical with the proviso that at least 2 carbon atoms are present between the NCO-groups in each case and (b) an organic compound containing at least two isocyanate-reactive groups characterized in that its molecular weight is about 60 to about 10,000 and in that the backbone of the resulting prepolymer is substantially immiscible in said polyethylene terephthalate.

4. The molding composition of claim 3 wherein said isocyanate-reactive group is selected from the group consisting of amino, thiol, carboxyl and hydroxyl radicals.

5. The molding composition of claim 3 wherein said (b) is a hydroxyl compound selected from the group consisting of hydroxy polyethers, hydroxy polyolefins, hydroxy polybutadienes, hydroxy polycarbonates and hydroxy polyester amides.

6. The molding composition of claim 3 wherein said organic polyisocyanate is at least one member selected from the group consisting of tetramethylenediisocyanate, hexamethylene-diisocyanate, dodecamethylene-diisocyanate, cyclobutane-1,3-diisocyanate, cyclohexane-1,3-diisocyanate, cyclohexane-1,4-diisocyanate, 1-isocyanato-3,3,5-trimethyl-5-isocyanatomethyl cyclohexane, 2,4-hexahydrotoluene-diisocyanate, 2,6-hexahydrotoluene diisocyanate, hexahydro-1,3-phenylene diisocyanate, hexahydro-1,4-phenylene diisocyanate, perhydro-2,4'-diphenylmethane diisocyanate, perhydro-4,4'-diphenylmethane diisocyanate, 1,3-phenylene diisocyanate, 1,4-phenylene diisocyanate, 2,4-toluene diisocyanate, 2,6-toluene diisocyanate, diphenylmethane-2,4'-diisocyanate, diphenylmethane-4,4'-diisocyanate and naphthylene-1,5-diisocyanate.

7. The molding composition of claim 3 wherein said organic polyisocyanate is at least one member selected from the group consisting of hexamethylene diisocyanate, 1-isocyanato-3,3,5-trimethyl-5-isocyanatomethyl cyclohexane, diphenylmethane-4,4'-diisocyanate, dicyclohexyl methane-4,4'-diisocyanate, 2,4-toluene diisocyanate and 2,6-toluene diisocyanate.

8. The molding composition of claim 1 wherein said polyisocyanate prepolymer is characterized in that it is blocked by an agent selected from the group consisting of secondary alcohols, tertiary alcohols, C-H acid esters, ketones, triazoles, oximes, lactams, phenols, amides, imides, imidazoles, bisulphites and hydroxy-substituted nitrogen compounds.

9. A thermoplastic molding composition comprising a blend of
   (i) polyethylene terephthalate resin,
   (ii) about 10 to about 50 percent relative to the weight of said blend, of reinforcing glass fibers and
   (iii) about 0.5 to about 8.0 parts per one hundred parts by weight of said resin, of a blocked polyisocyanate prepolymer which is the polyaddition reaction product of toluene diisocyanate and hydroxy polyether which product is blocked by ε-caprolactam.

10. A thermoplastic molding composition comprising the extruded blend of
    (i) polyethylene terephthalate,
    (ii) a reinforcing amount of a reinforcing agent of said polyethylene terephthalate and
    (iii) about 0.5 to about 8.0 parts per hundred weight of said polyethylene terephthalate of an end-capped polyisocyanate prepolymer.

11. The thermoplastic molding composition of claim 10 wherein said (iii) is present at an amount of about 1.0 to about 5.0 parts per hundred weight.

* * * * *